United States Patent
Kant et al.

(10) Patent No.: US 10,932,166 B2
(45) Date of Patent: Feb. 23, 2021

(54) METHOD AND SYSTEM FOR SESSION RESILIENCE IN PACKET GATEWAYS

(71) Applicant: MAVENIR SYSTEMS, INC., Richardson, TX (US)

(72) Inventors: Nishi Kant, Fremont, CA (US); Ajaypal Singh, Milpitas, CA (US); Sudhagar Chinnaswamy, San Jose, CA (US)

(73) Assignee: Mavenir Systems, Inc., Richardson, TX (US)

( * ) Notice: Subject to any disclaimer, the term of this patent is extended or adjusted under 35 U.S.C. 154(b) by 159 days.

(21) Appl. No.: 16/360,156

(22) Filed: Mar. 21, 2019

(65) Prior Publication Data
US 2019/0223062 A1 Jul. 18, 2019

Related U.S. Application Data

(63) Continuation of application No. PCT/US2017/038099, filed on Jun. 19, 2017.
(Continued)

(51) Int. Cl.
*H04W 36/00* (2009.01)
*H04W 92/14* (2009.01)
(Continued)

(52) U.S. Cl.
CPC ..... *H04W 36/0022* (2013.01); *H04L 12/4633* (2013.01); *H04L 12/66* (2013.01);
(Continued)

(58) Field of Classification Search
CPC ..... H04L 12/4633; H04L 12/66; H04L 45/00; H04L 45/302; H04L 61/3075;
(Continued)

(56) References Cited

U.S. PATENT DOCUMENTS 6,400,681 B1 * 6/2002 Bertin .................. H04L 49/205
370/218
8,855,071 B1 * 10/2014 Sankaran ............. H04W 76/11
370/329
(Continued)

OTHER PUBLICATIONS

International Search Report for International Application No. PCT/US2017/038099, dated Sep. 10, 2017, 6 pages.
(Continued)

*Primary Examiner* — Dung B Huynh
(74) *Attorney, Agent, or Firm* — Ohlandt, Greeley, Ruggiero & Perle, L.L.P.

(57) ABSTRACT

Use of available bits in the TEID field of the GTP header to hold information needed to recreate at least a partial state of the session, enough for it to be routed, without waiting for a full state update. The GTP PDU contains the IP Payload with the source and destination IP addresses. The embodiments use that information and the coded TEID bits to provide sufficient routing information so that the packet can be routed without the full state. The TEID is coded to include bits identifying the APN and bits identifying the QCI of the session. A bit can be used to indicate drop if the full state not available. The remaining bits are used to identify unique user sessions. Some of the TEID bits can be encoded with the charging ID. Because sufficient routing information is provided in each packet, a backup gateway does not need to checkpoint.

14 Claims, 9 Drawing Sheets

Related U.S. Application Data (60) Provisional application No. 62/397,718, filed on Sep. 21, 2016.

(51) Int. Cl.
| | | |
|---|---|---|
| *H04L 12/701* | (2013.01) | |
| *H04L 12/725* | (2013.01) | |
| *H04W 76/12* | (2018.01) | |
| *H04W 76/11* | (2018.01) | |
| *H04L 12/46* | (2006.01) | |
| *H04L 12/66* | (2006.01) | |
| *H04L 29/12* | (2006.01) | |
| *H04W 28/02* | (2009.01) | |

(52) U.S. Cl.
CPC ............ *H04L 45/00* (2013.01); *H04L 45/302* (2013.01); *H04L 61/3075* (2013.01); *H04W 28/0268* (2013.01); *H04W 76/11* (2018.02); *H04W 76/12* (2018.02); *H04W 92/14* (2013.01)

(58) Field of Classification Search
CPC ............. H04L 12/2859; H04L 12/4641; H04L 29/06068; H04L 29/06551; H04W 28/0268; H04W 36/0022; H04W 76/11; H04W 76/12; H04W 92/14
See application file for complete search history.

(56) References Cited

U.S. PATENT DOCUMENTS

| | | | | |
|---|---|---|---|---|
| 9,191,865 | B1 * | 11/2015 | Paczkowski | H04W 12/08 |
| 9,264,942 | B2 | 2/2016 | Sarkar et al. | |
| 9,271,183 | B1 * | 2/2016 | Oroskar | H04W 72/1252 |
| 9,420,000 | B2 * | 8/2016 | Stojanovski | H04W 76/12 |
| 9,516,567 | B2 * | 12/2016 | Faccin | H04W 36/14 |
| 9,973,966 | B2 * | 5/2018 | Karampatsis | H04W 72/1242 |
| 2004/0170181 | A1 * | 9/2004 | Bogdon | H04L 12/5692 |
| | | | | 370/400 |
| 2004/0266394 | A1 * | 12/2004 | Mizell | H04W 4/24 |
| | | | | 455/408 |
| 2007/0162289 | A1 | 7/2007 | Olsson et al. | |
| 2007/0258427 | A1 * | 11/2007 | Shaheen | H04W 76/12 |
| | | | | 370/338 |
| 2008/0254768 | A1 * | 10/2008 | Faccin | H04W 76/10 |
| | | | | 455/411 |
| 2010/0202351 | A1 * | 8/2010 | Xi | H04L 61/3075 |
| | | | | 370/328 |
| 2010/0260129 | A1 * | 10/2010 | Ulupinar | H04W 28/06 |
| | | | | 370/329 |
| 2011/0142044 | A1 * | 6/2011 | Csaszar | H04L 9/083 |
| | | | | 370/390 |
| 2011/0176510 | A1 * | 7/2011 | Hallenstal | H04W 36/0022 |
| | | | | 370/331 |
| 2012/0122464 | A1 | 5/2012 | Zhou et al. | |
| 2012/0157132 | A1 * | 6/2012 | Olsson | H04W 68/00 |
| | | | | 455/458 |
| 2012/0224564 | A1 * | 9/2012 | Paisal | H04N 7/148 |
| | | | | 370/331 |
| 2013/0301611 | A1 * | 11/2013 | Baghel | H04L 67/18 |
| | | | | 370/331 |
| 2014/0003357 | A1 * | 1/2014 | Ejzak | H04W 76/12 |
| | | | | 370/329 |
| 2014/0119353 | A1 * | 5/2014 | McCann | H04L 69/161 |
| | | | | 370/338 |
| 2014/0241317 | A1 * | 8/2014 | Jamadagni | H04W 40/36 |
| | | | | 370/331 |
| 2015/0009826 | A1 * | 1/2015 | Ma | H04L 47/2408 |
| | | | | 370/235 |
| 2015/0043531 | A1 * | 2/2015 | Masini | H04W 76/25 |
| | | | | 370/331 |
| 2015/0071169 | A1 * | 3/2015 | Wang | H04W 8/02 |
| | | | | 370/328 |
| 2015/0103746 | A1 * | 4/2015 | Matsushima | H04L 69/22 |
| | | | | 370/328 |
| 2015/0117408 | A1 * | 4/2015 | Kedalagudde | H04W 36/0027 |
| | | | | 370/331 |
| 2015/0208317 | A1 * | 7/2015 | Backman | H04L 45/74 |
| | | | | 370/338 |
| 2015/0215978 | A1 * | 7/2015 | Casati | H04W 76/11 |
| | | | | 370/329 |
| 2015/0282017 | A1 * | 10/2015 | Wang | H04W 72/0406 |
| | | | | 370/331 |
| 2015/0282026 | A1 * | 10/2015 | Gupta | H04W 48/16 |
| | | | | 370/331 |
| 2016/0072930 | A1 * | 3/2016 | Shi | H04L 69/22 |
| | | | | 370/392 |
| 2016/0073297 | A1 * | 3/2016 | Hwang | H04W 76/20 |
| | | | | 370/331 |
| 2016/0156676 | A1 * | 6/2016 | Verin | H04L 65/80 |
| | | | | 709/228 |
| 2016/0234760 | A1 * | 8/2016 | Orlandi | H04W 48/14 |
| 2016/0316393 | A1 * | 10/2016 | Pantelidou | H04W 24/10 |
| 2017/0034749 | A1 * | 2/2017 | Chandramouli | H04W 36/14 |
| 2017/0070921 | A1 * | 3/2017 | Lau | H04W 36/0022 |
| 2017/0079075 | A1 * | 3/2017 | Han | H04W 72/0486 |
| 2017/0126618 | A1 * | 5/2017 | Bhaskaran | H04L 61/2015 |
| 2017/0195933 | A1 * | 7/2017 | Shi | H04W 36/38 |
| 2017/0238213 | A1 * | 8/2017 | Bezawada | H04W 36/0005 |
| | | | | 370/331 |
| 2017/0244705 | A1 * | 8/2017 | Ha | H04L 63/0876 |
| 2017/0310592 | A1 * | 10/2017 | Synnergren | H04L 45/38 |
| 2018/0041934 | A1 * | 2/2018 | Agarwal | H04L 65/1069 |
| 2018/0084564 | A1 * | 3/2018 | Xu | H04W 76/12 |
| 2018/0139651 | A1 * | 5/2018 | Kim | H04L 29/12 |
| 2018/0184323 | A1 * | 6/2018 | Xiong | H04W 8/24 |
| 2018/0213587 | A1 * | 7/2018 | Kim | H04W 40/24 |
| 2018/0249528 | A1 * | 8/2018 | Kuge | H04W 76/27 |
| 2018/0255481 | A1 * | 9/2018 | Chen | H04W 88/14 |
| 2018/0288671 | A1 * | 10/2018 | Jin | H04W 76/12 |
| 2018/0316522 | A1 * | 11/2018 | Chen | H04W 76/19 |
| 2018/0338265 | A1 * | 11/2018 | Goel | H04W 28/0263 |
| 2019/0260857 | A1 * | 8/2019 | Zhou | H04L 69/22 |
| 2020/0288352 | A1 * | 9/2020 | Hu | H04L 47/24 |

OTHER PUBLICATIONS

Written Opinion for International Application No. PCT/US2017/038099, dated Sep. 10, 2017, 5 pages.

"3Technical Specification Group Services and System Aspects; General Packet Radio Service (GPRS); Service description; Stage 2 (Release 14)", V14.0.0, (Jun. 26, 2016), pp. 1-363, Generation Partnership Project—3GPP, Jun. 22, 2016 (Jun. 22, 2016) Section 9.2.2.

International Preliminary Report on Patentability for International (PCT) Application No. PCT/US2017/038099, 5 pages, dated Mar. 26, 2019.

* cited by examiner

GTPv1 headers contain the following fields:

| + | 0-2 | 3 | 4 | 5 | 6 | 7 | 8-15 | 16-23 | 24-31 |
|---|---|---|---|---|---|---|---|---|---|
| 0 | Version | Protocol Type | Reserved | Extension Header Flag | Sequence Number Flag | N_PDU Number Flag | Message Type | Message Length | |
| 32 | TEID | | | | | | | | |
| 64 | Sequence Number | | | | | | | N_PDU Number | Next Extension Header Type |

Fig. 7A

GTPv2 headers contain the following fields:

| + | 0-2 | 3 | 4 | 5-7 | 8-15 | 16-23 | 24-31 |
|---|---|---|---|---|---|---|---|
| 0 | Version | Piggybacking Flag | TEID Flag | Spare | Message Type | Message Length | |
| 32 | TEID (if present) | | | | | | |
| 64 | Sequence Number | | | | | | Spare |

METHOD AND SYSTEM FOR SESSION RESILIENCE IN PACKET GATEWAYS

CROSS REFERENCE TO RELATED APPLICATIONS

This application is a continuation of International (PCT) Application No. PCT/US2017/038099 entitled "Method and System for Session Resilience in Packet Gateways," filed Jun. 19, 2017 and claims the benefit under 35 U.S.C. § 19(e) of U.S. Provisional Patent Application No. 62/397,718, entitled "Method and System for Session Resilience in Packet Gateways," filed Sep. 21, 2016, both of which are hereby incorporated by reference.

BACKGROUND

Gateway products sit between the user and the IP (Internet protocol) services, generally the Internet, and typically need session information for each user to properly treat and forward the packets to IP services. This treatment might be necessary for mobility, security, charging and QoS (quality of service) reasons. For example, the PDN-GW (packet data network gateway) or P-GW in 4G mobile networks, is the mobility anchor for the UE (user equipment). The P-GW terminates the Point to Point connection with the UE, collects charging information, applies policies and decides which PDN the UE receives IP services from. Similarly, the Serving-GW or S-GW is responsible for connectivity state management (idle/active), QCI (QoS class identifier) application and directing the traffic to the P-GW that is the mobility anchor and gateway to the selected IP service. The P-GW and S-GW functions can be combined as an SAE-GW (system architecture evolution gateway).

A traditional SAE-GW may serve a million or more users. For each served user, the SAE-GW maintains a session context which contains information such as correlating mobile identities (IMSI—International Mobile Subscriber Identity), Charging ID, TFT (Traffic Flow Template), credit-control usage counters, APN (access point name—a string identifying the PDN to connect to), etc. The traffic originating from and terminating at the UE is organized as bearers. For each PDN the UE needs service from, it has a default bearer. It may have additional (optional) dedicated bearers. The dedicated bearers differ in quality of service and have an associated TFT so that the bidirectional differentiation is provided. The TFT could be a set of packet filters using 5 tuples derived from the network and transport packet header fields, e.g. IP header or any subset thereof. When an IP packet destined to the UE arrives at the SAE-GW, it looks for a matching TFT and then applies the associated policy including QoS treatment. For example, when a VoLTE (voice over long term evolution) packet arrives at an SAE-GW from the network, it would find a matching TFT and apply GBR (Guaranteed Bit Rate) for the voice stream. The traffic coming from the UE to the SAE-GW is tunneled in GTP (general packet radio service (GPRS) tunneling protocol) packets (an IP-in-IP encapsulation protocol, widely used in mobile networks). The GTP header includes a TEID (tunnel endpoint identifier) that uniquely identifies the bearer for the Point-to-Point connection to the UE.

A typical implementation of an SAE-GW would look at the TEID of the incoming packet and reference its session context in its memory to find out how to process received packets, update the counters, apply policies and decide where to send the packet for egress. The TEID is assigned by the SAE-GW during initial signaling related to bearer activation. Therefore, it is possible for the SAE-GW to encode the TEID in a way that helps it optimize packet processing. For packets coming from the network side, the look up is performed using the IP address of the destination UE.

An interesting situation arises when a UE goes to idle mode. In wireless communication, given the scarcity of radio resources, the UE is allocated radio resources only when it is actively transmitting or receiving packets. Otherwise it goes to idle mode. The network marks this transition but keeps all session information in the context so that the idle to active transition can happen with less signaling/processing than that in bearer activation. When a packet arrives for the UE when it is in idle mode, the network first has to find where it is (since it can move while being in idle mode) and then bring it to active mode. This process is called paging.

From the foregoing, the importance of session context under which the SAE-GW has to process the traffic becomes clear. Therefore, for high availability, traditional implementations follow 1:1 or N:1 redundancy of SAE-GWs, whereby the session context information is replicated and check-pointed in a backup entity for every primary SAE-GW. In event of failure of the Primary node, the traffic switches to the backup and the backup resumes the process using the last checkpointed context. This method of providing high availability has been around for decades. In fact, in wireless communication, the 2G system which was based on circuit switch technology for voice, employed the same method. In those days, the primary MSC (Mobile Switching Center) would have 1:1 redundancy with a back-up MSC where session information would be replicated and check-pointed. MSC and Gateway MSC (GMSC) served functions similar to S-GW and P-GW for circuit switched voice. These functions counted minutes and decided the path that incoming traffic should take.

Despite these similarities, there are stark differences between a gateway for circuit switched (CS) voice and packet gateway for packet switched (PS) data.

1) CS—In case of circuit switched voice (irrespective of analog or digital voice), the bearer does not carry any useful information with respect to user identity, session identity, source or destination. All such information is present only in the session context. This is true even when circuit switched systems are used to transport data.

2) PS—In contrast, every packet header carries source address, destination address and ports that may reveal nature of session (web, voice, file transfer) and ToS (type of service) bits that may indicate the quality of service. Furthermore, in case of tunneled traffic, the tunnel identifier can identify the session and more of its attributes. This is true even when packet based system carries packetized voice such as VoIP (voice over IP) and VoLTE.

3) CS—Once the circuit is established, there is no differential treatment needed or provided for the bearer at gateway or intermediate nodes. Therefore, information that needs to be maintained in session context is less to begin with and changes less dynamically. Voice service is billed by minutes. Activation of supplementary service is another dynamic aspect of voice traffic, but that too is infrequent within a voice session.

4) PS—In contrast, packet based data service is generic and can carry many types of communication, continuous video streaming to intermittent instant messages. This means for the same user session, multiple streams with differing QoS needs are likely. In case of a packet based session not only the time duration but actual number of bytes transferred becomes basis of charging. Secondly, each type of traffic could have different economic value and might need to be counted separately.

5) CS—In the case of circuit switched voice, the User has one network identifier (e.g. phone number) and he/she typically connects to one correspondent. In the case of 3-way calling, the user would be connected to more than one party but all will be part of same session.

6) PS—In contrast, the UE in an LTE network can have multiple IP addresses and applications on the UE can connect to different PDNs using different IP addresses. How the SAE-GW or a supported APN is connected to a PDN network is independent of user activity.

From the foregoing it should be clear that context information for a data session would be much larger than in the case of pure circuit switched voice. Moreover, the data context information would be changing more frequently, since the change could be pertaining to any of the bearers and obviously the packet count will be changing continuously for each active bearer, therefore necessitating more frequent checkpointing Thus using the 1:1 or N:1 failover method that worked well for circuit switched voice becomes very burdensome for data sessions. 1:1 redundancy is wasteful in resources and is expensive. Even in a virtualized world where a VM (virtual machine) can be spun dynamically, it would take significant time (unacceptable in most cases) to have it running, get it initialized and then take on recovery information. Therefore, resource requirements are still applicable in a virtualized scenario. N:1 redundancy requires N times the checkpointing done to a single backup. Methods that require session information to be loaded from a repository upon failover could take many seconds to load the complete session information.

SUMMARY

Embodiments according to the invention use available bits in the header to hold information needed to recreate at least partial state of the flow, preferably enough for it to be routed, without waiting for a full state update. The problem being solved is a P-GW or S-GW (or combined as an SAE-GW) failing. Normally things grind to a halt until the backup gateway gets loaded with all the state information for flows that were being handled by the failed gateway. This can be a very noticeable MTTR (Mean Time to Repair).

Because the packets are all tunneled using GTP, they all contain a 32-bit TEID value. Further, the GTP PDU (protocol data unit) contains the IP Payload with the source and destination IP addresses. The embodiments use that information and coded TEID bits to provide sufficient routing information so that the packet can be routed without the full state. Breakout of the TEID is preferably as follows: 4-8 bits can be used to identify the APN. 3 bits can identify the QCI. A bit can be used to indicate drop if the full state not available. This leaves 20-24 bits to use as desired. In the preferred embodiment, these 20-24 bits are used to identify unique user sessions. The remaining embodiments build on that. A next embodiment uses some of the TEID bits (the 20-24 bits) to encode the charging ID (in combination with the SAE-GW IP address). Another embodiment removes checkpointing for the session table in the backup SAE-GW, as it then contains relatively static information after the information provided in TEID in the preferred embodiment is removed. The no checkpointing embodiment can have an embodiment where a "recovery" flag is set by the supervisor to do the failover recovery, rather than automatically on failover. An alternate embodiment places a recover flag in the packets from the eNB (evolved node B) to make the backup SAE-GW start to rebuild. In yet another embodiment, the TFT is where state is maintained, and the IP addresses and TEID bits are used to start building the TFT in the backup SAE-GW. In a further embodiment the backup (now primary) SAE-GW uses the TEID as a pointer and keeps counting packets to allow a later charge back once full state is ready, so that the TEID bits are not used for charging bits as done in a different embodiment. Another embodiment covers the case of traffic back to the UE from the network, with the SAE-GW dropping the traffic until state is built. In an alternate embodiment, once partial state has been obtained based on the addresses and the TEID but the UE is idle, the UE is paged to wake up to complete state setup. In an embodiment, state rebuild is a background task and turns off the "recovery" flag when done.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION

This description describes how to make use of the information present in a packet to restore the data flows faster and to provide a better user experience. Prior to addressing the preferred embodiments, so background on the environment is considered helpful.

Figure 1:
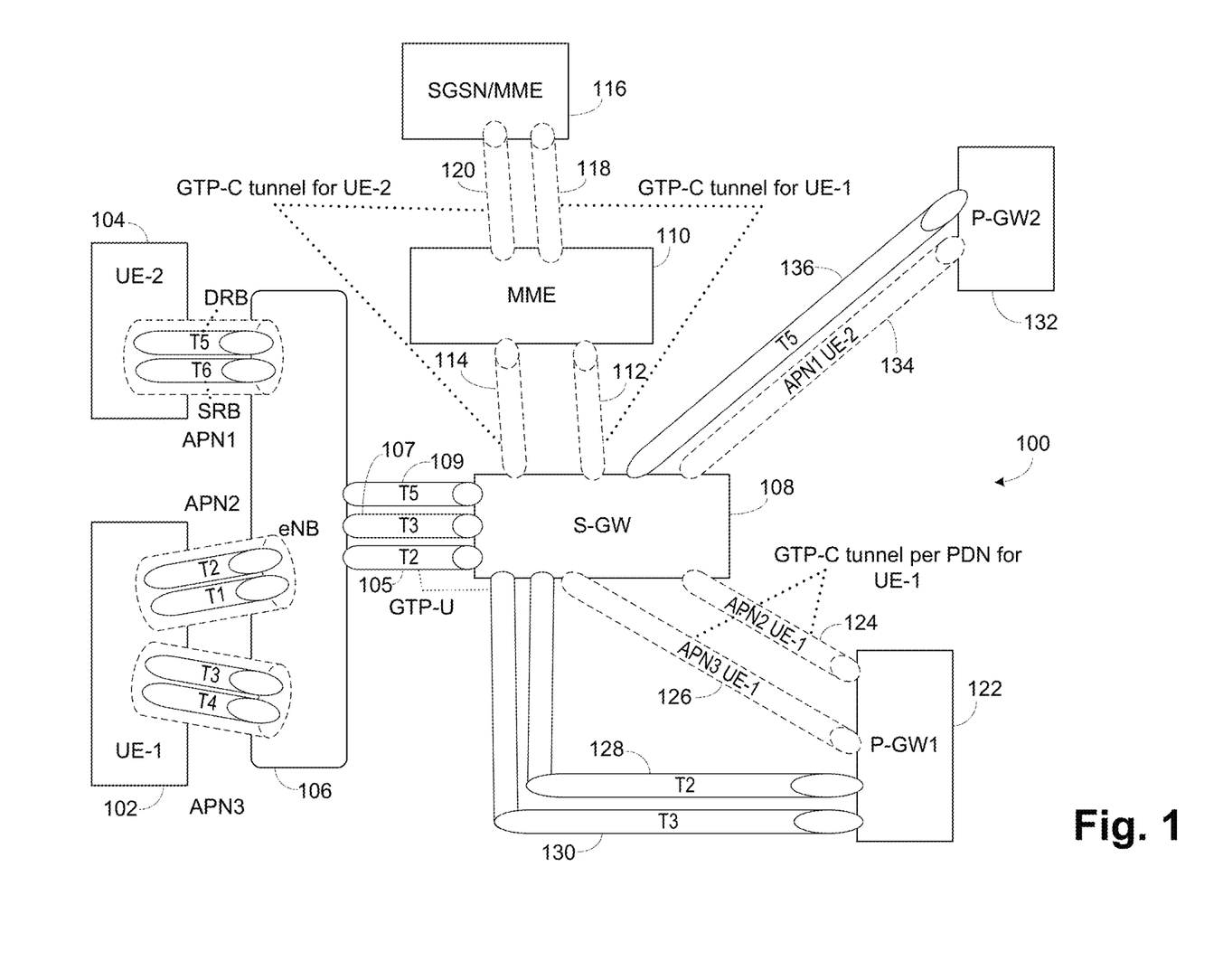
FIG. 1 is a block diagram illustrating GTP tunnels between devices in the mobile core.

Referring to FIG. 1, various tunnels in an LTE system 100 are illustrated. UE-1 102 and UE-2 104 are connected to an eNB 106. UE-1 102 is connecting to two different APNs, APN2 and APN3, (not shown). UE-2 104 is connecting to APN1 (not shown). UE-1 102 connects to eNB 106 using an SRB (signaling radio bearer) T1 and DRB (data radio bearer) T2 for connections to APN2. UE-1 102 connects to eNB 106 using SRB T4 and DRB T3 for connections to APN3. UE-2 104 connects to eNB 106 using SRB T6 and DRB T5.

eNB 106 connects to S-GW 108 using three GTP-U tunnels T2 105 for UE-1 102 to APN2, T3 107 for UE-1 102 to APN3 and T5 109 for UE-2 104 to APN1. GTP-U tunnels are used S-GW 108 connects to MME (mobility management entity) no with a GTP-C tunnel 112 for UE-1 102 and a GTP-C tunnel 114 for UE-2 104. MME no connects to SGSN (serving GPRS support node)/MME 116 using a GTP-C tunnel 118 for UE-1 102 and a GTP-C tunnel 120 for UE-2 104.

S-GW 108 connects to P-GW1 122, which is used to access APN2 and APN3, using GTP-C tunnel 124 for APN2 for UE-1 102, GTP-C tunnel 126 for APN3 for UE-1 102, GTP-U tunnel T2 128 for APN2 for UE-1 102, and GTP-U tunnel T3 130 for APN3 for UE-1 102. S-GW 108 connects to P-GW2 132, which is used to access APN1, using GTP-C tunnel 134 for UE-2 104 and GTP-U tunnel T5 136 for APN1 for UE-2 104.

Figure 2:
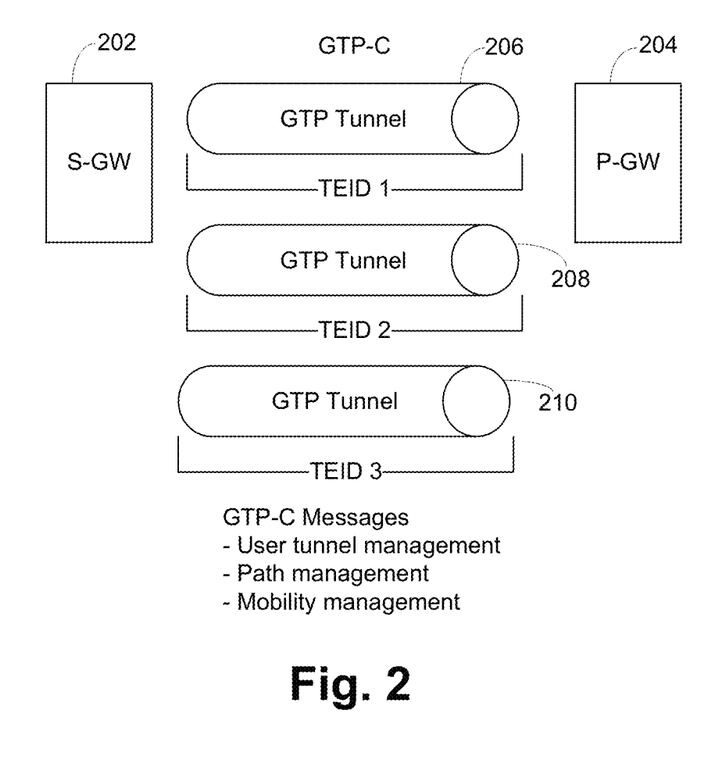
FIG. 2 is a block diagram illustrating multiple GTP tunnels between nodes in the mobile core.
Figure 7A:
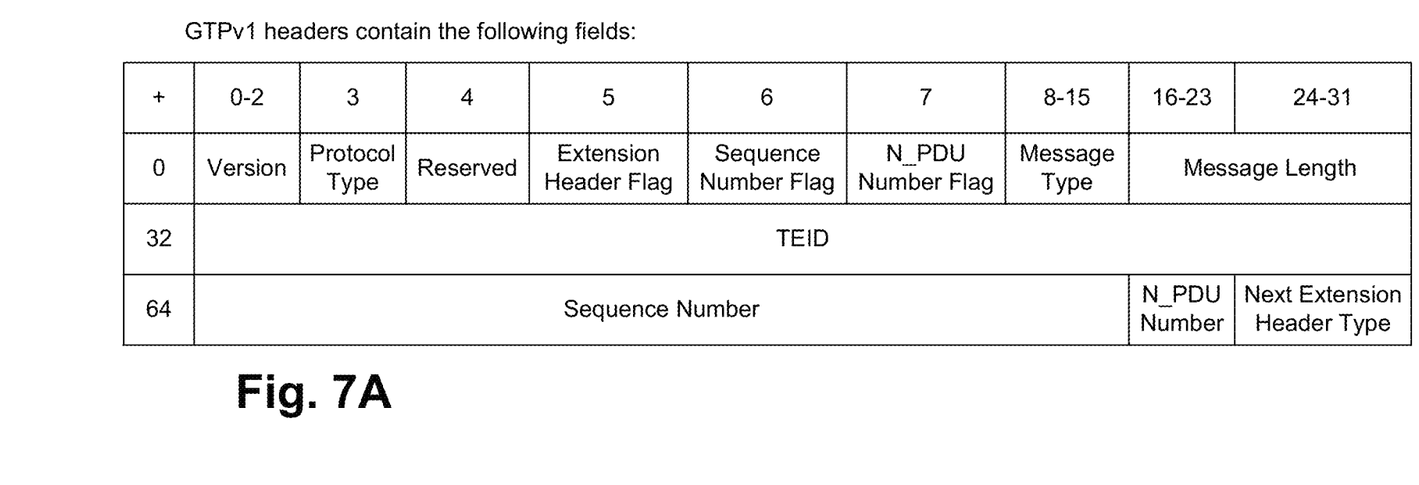
FIG. 7A is a diagram of a GTPv1 header.
Figure 7B:
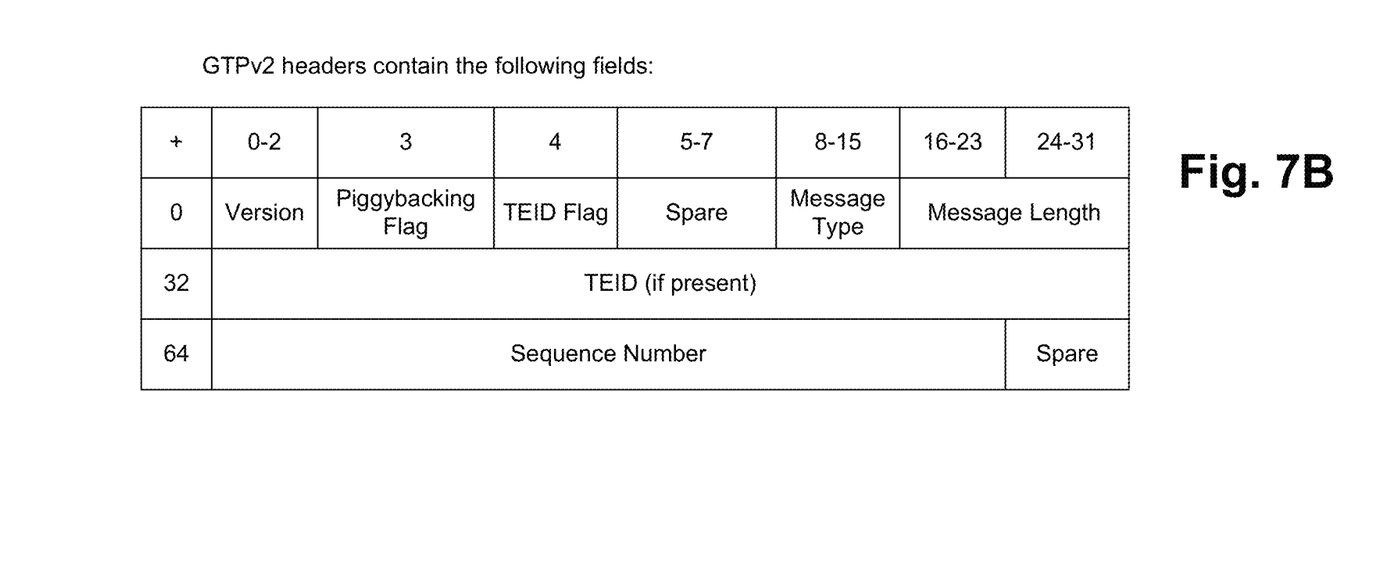
FIG. 7B is a diagram of a GTPv2 header.

FIG. 2 provides a little more detail on GTP-C tunnels. GTP-C is used for user tunnel management, path management and mobility management. An S-GW 202 is connected to a P-GW 204 using a plurality of GTP-C tunnels 206, 208 and 210. One GTP-C tunnel is used for each APN for each UE. The illustrated three GTP-C tunnels 206, 208 and 210 thus could represent three different APNs for one UE or one APN for each of three UEs, or some combination in between. FIGS. 7A and 7B illustrate the GTP headers for v1 and v2. Relevant for this description is that each GTP header contains a TEID value. Further details on the GTP header fields is not provided as the meanings are well known. Because each GTP tunnel is for a different APN/UE combination, FIG. 2 illustrates three TEIDs: TEID 1 206, TEID 2 208 and TEID 3 210.

Figures 3A, 3B:
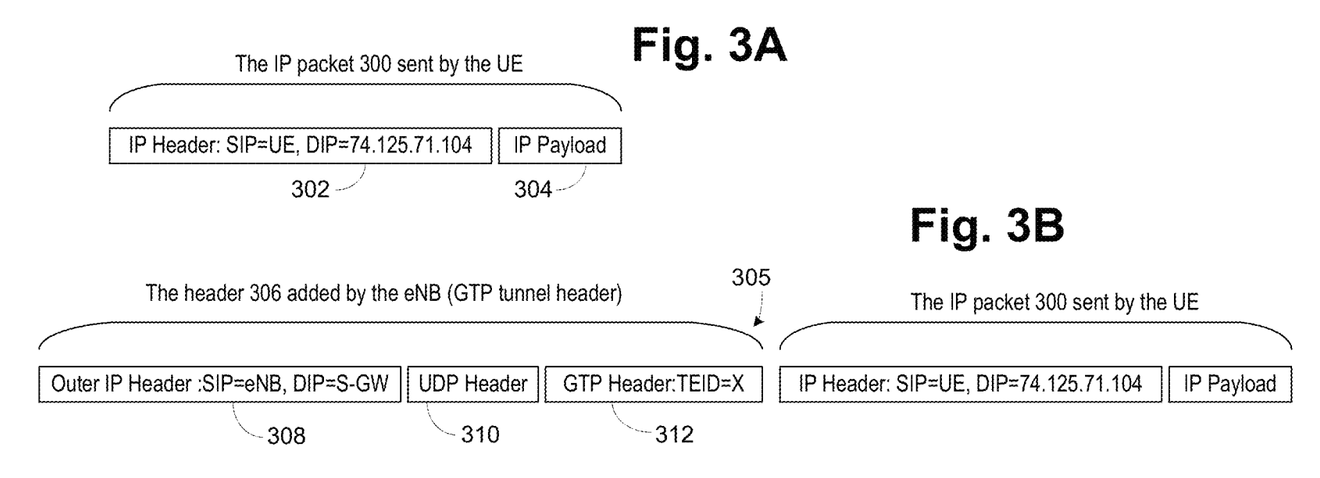
FIG. 3A is a diagram of an IP packet from a UE to an eNode.
FIG. 3B is a GTP packet from an eNode to an S-GW.

FIGS. 3A-3D illustrate the packet headers as an IP data packet travels from a UE to a APN or PDN. The IP packet 300 provided by the UE to the eNB is shown in FIG. 3A. An IP header 302 includes a source IP address of the UE and a destination IP address of the destination, illustrated as 74.125.741.104. An IP payload 304 is included after the IP header 302.

FIG. 3B illustrates the packet 305 as provided from the eNB to the S-GW. A GTP tunnel header 306 has been added to the IP packet 300. The GTP tunnel header 306 includes an out IP header 308 including a source IP address of the eNB and a destination address of the S-GW, a UDP (user datagram protocol) header 310 and a GTP header 312 including a TEID value.

Figures 3C, 3D:
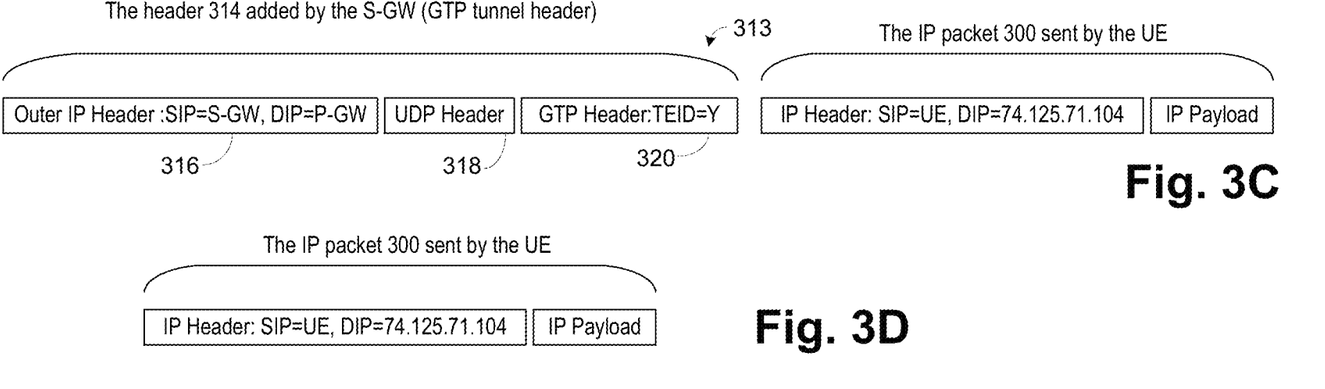
FIG. 3C is a GTP packet from the S-GW to a P-GW.
FIG. 3D is an IP packet form the P-GW to the Internet.

FIG. 3C illustrates the packet 313 as provided from the S-GW to the P-GW. A GTP tunnel header 314 has been added to the IP packet 300. The GTP tunnel header 314 includes an out IP header 316 including a source IP address of the S-GW and a destination address of the P-GW, a UDP (user datagram protocol) header 318 and a GTP header 320 including a TEID value.

FIG. 3D illustrates the IP packet 300 that is provided from the P-GW to the APN or PDN.

Figure 4A:
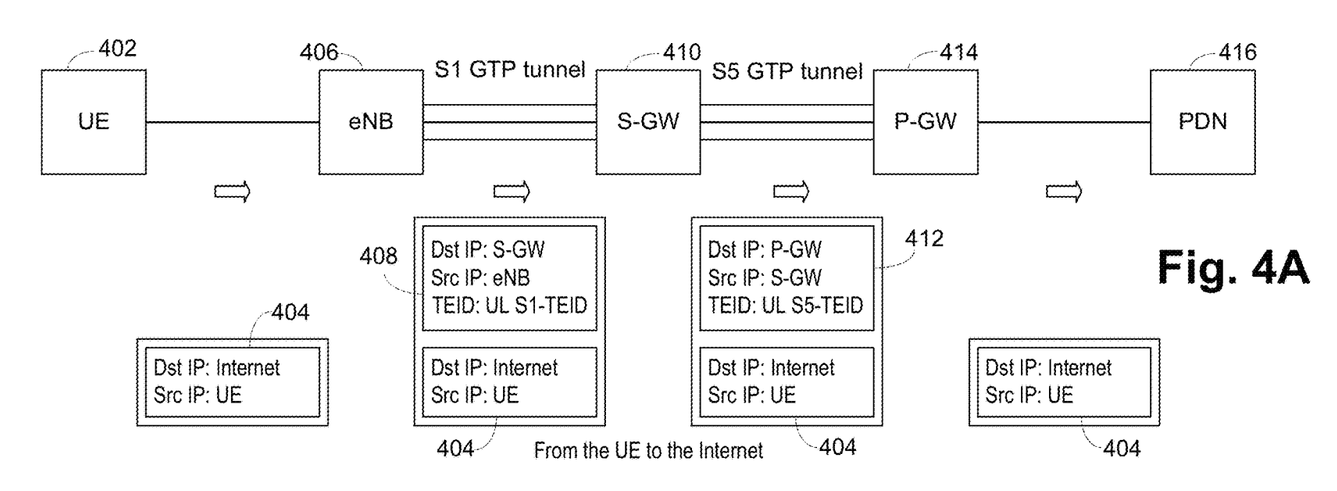
FIG. 4A is a block diagram of devices in the mobile core from the UE to the Internet and packets between the devices.
Figure 4B:
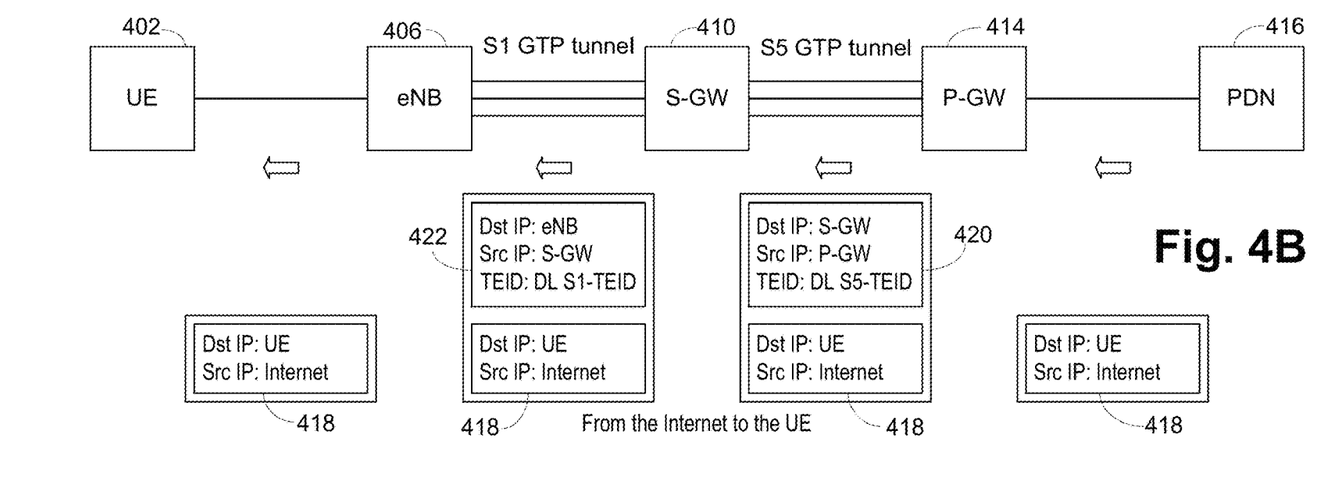
FIG. 4B is a block diagram of devices in the mobile core from the Internet to the UE and packets between the devices.

FIGS. 4A and 4B provide an alternate illustration of IP packet flow between a UE and a PDN, FIG. 4A illustrating uplink flow, while FIG. 4B illustrates downlink flow. A UE 402 provides an IP packet 404, having a destination IP address of the desired Internet location and a source IP address of the UE, to an eNB 406. The eNB 406 adds a GTP tunnel header 408, having a destination IP address of an S-GW 410, a source IP address of the eNB 406 and a TEID which indicates the uplink S1 GTP tunnel for the UE 402, a PDN 416 and the S-GW 410, and transmits the packet over an S1 GTP tunnel to the S-GW 410. The S-GW 410 replaces the GTP tunnel header 408 with a new GTP tunnel header 412, having a destination IP address of a P-GW 414, a source IP address of the S-GW 410 and a TEID which indicates the uplink S5 GTP tunnel for the UE 402, the PDN 416 and the P-GW 414, and transmits the packet over an S5 GTP tunnel to the P-GW 414. The P-GW 414 strips the GTP tunnel header 412 and transmits the IP packet 404 to the PDN 416.

The PDN 416 provides a responsive IP packet 418 for the UE 402, the IP packet 418 having a destination IP address of the UE and a source IP address of the Internet location, to the P-GW 414. The P-GW 414 adds a GTP tunnel header 420, having a destination IP address of the S-GW 410, a source IP address of the P-GW 414 and a TEID which indicates the downlink S5 GTP tunnel for the UE 402, the PDN 416 and the S-GW 410, and transmits the packet over an S5 GTP tunnel to the S-GW 410. The S-GW 410 replaces the GTP tunnel header 420 with a new GTP tunnel header 422, having a destination IP address of the eNB 406, a source IP address of the S-GW 410 and a TEID which indicates the downlink S1 GTP tunnel for the UE 402, the PDN 416 and the eNB 406, and transmits the packet over an S1 GTP tunnel to the eNB 406. The eNB 406 414 strips the GTP tunnel header 422 and transmits the IP packet 418 to the UE 402.

Figure 5:
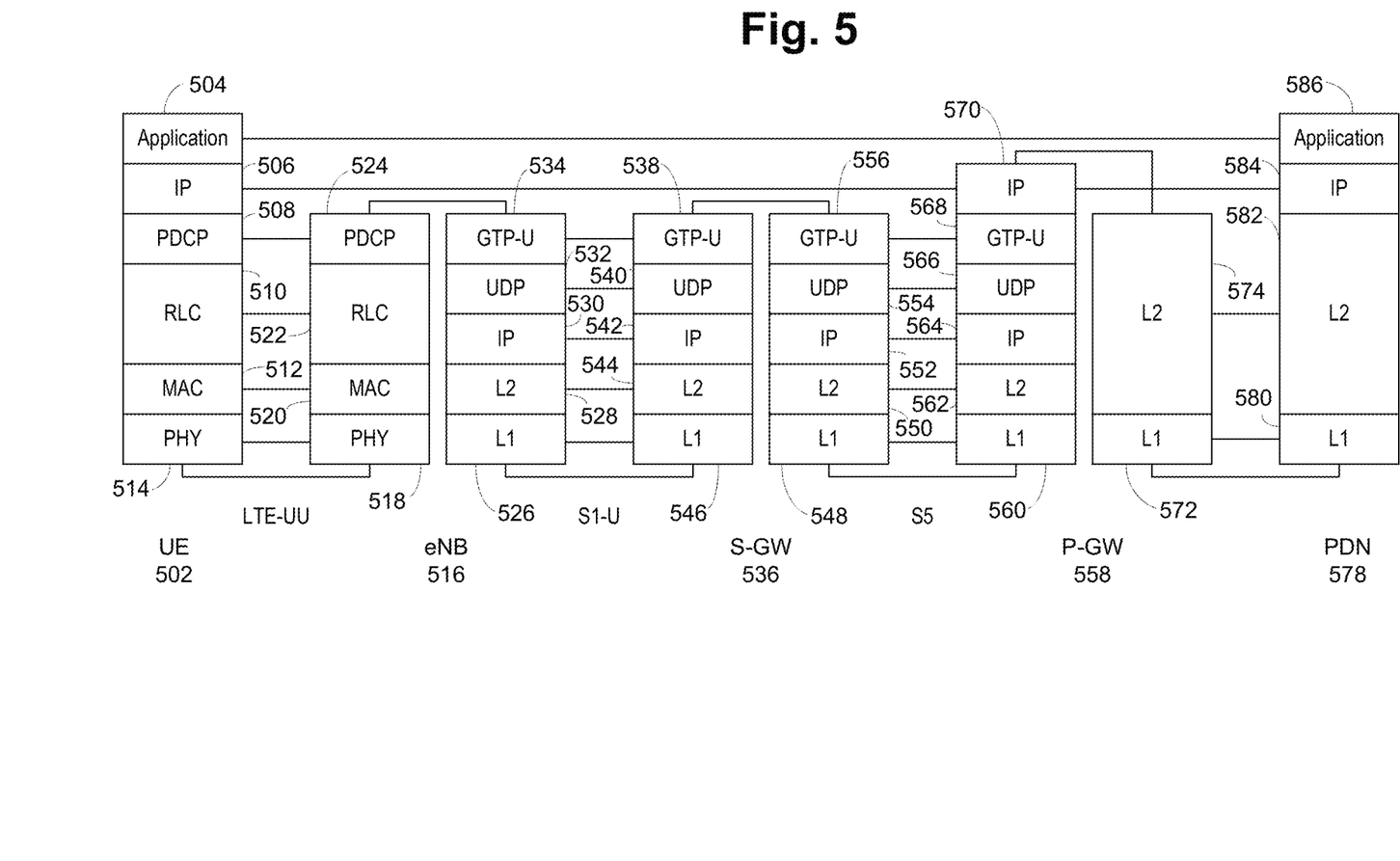
FIG. 5 is a block diagram illustrating the related protocol stacks from a UE to a PDN.

FIG. 5 illustrates a protocol stack view of the transfer from a UE 502 to a PDN 578. The UE 502 includes an application layer 504 to provide the data payload, an IP layer 506 to produce the IP packet being transmitted, a PDCP (packet data convergence protocol) layer 508, an RLC (radio link control) layer 510, a MAC layer 512 and a PHY layer 514. An eNB 516 has a PHY layer 518 to cooperate with the UE 502 PHY layer 514, a MAC layer 520 to cooperate with the UE 502 MAC layer 520, an RLC layer 522 to cooperate with the UE 502 RLC layer 510 and a PDCP layer 524 to cooperate with the UE 502 PDCP layer 508.

The eNB 516 removes all layers to retrieve the IP packet provided by the UE 502 IP layer 506 and then passes the IP packet through a GTP-U layer 534, a UDP layer 532, an outer IP layer 530, an L2 layer 528 and an L1 layer 526. An S-GW 536 has an L1 layer 546 to cooperate with the eNB 516 L1 layer 526, an L2 layer 544 to cooperate with the eNB 516 L2 layer 528, an outer IP layer 542 to cooperate with the eNB 516 outer IP layer 530, a UDP layer 540 to cooperate with the eNB 516 UDP layer 532, and a GTP-U layer 536 to cooperate with the eNB 516 GTP-U layer 534.

The S-GW 536 removes all layers to retrieve the IP packet provided by the UE 502 IP layer 506 and then passes the IP packet through a GTP-U layer 556, a UDP layer 554, an outer IP layer 552, an L2 layer 550 and an L1 layer 548. A P-GW 558 has an L1 layer 560 to cooperate with the S-GW 536 L1 layer 548, an L2 layer 562 to cooperate with the S-GW 536 L2 layer 550, an outer IP layer 564 to cooperate with the S-GW 536 outer IP layer 552, a UDP layer 566 to cooperate with the S-GW 536 UDP layer 554, a GTP-U layer 568 to cooperate with the S-GW 536 GTP-U layer 556 and an IP layer 570 to cooperate with the UE 502 IP layer 506.

The P-GW 558 provides the IP packet reviewed by IP layer 570 to an L2 layer 574, which provides the packet to an L1 layer 572. The PDN 578 has an L1 layer 580 to cooperate with P-GW 558 L1 layer 560, an L2 layer 582 to cooperate with P-GW 558 L2 layer 562, an IP layer 584 to cooperate with P-GW 228 L2 layer 570 and UE 502 IP layer 506 and an application layer 586 to cooperate with UE 502 application layer 504.

Figure 6:
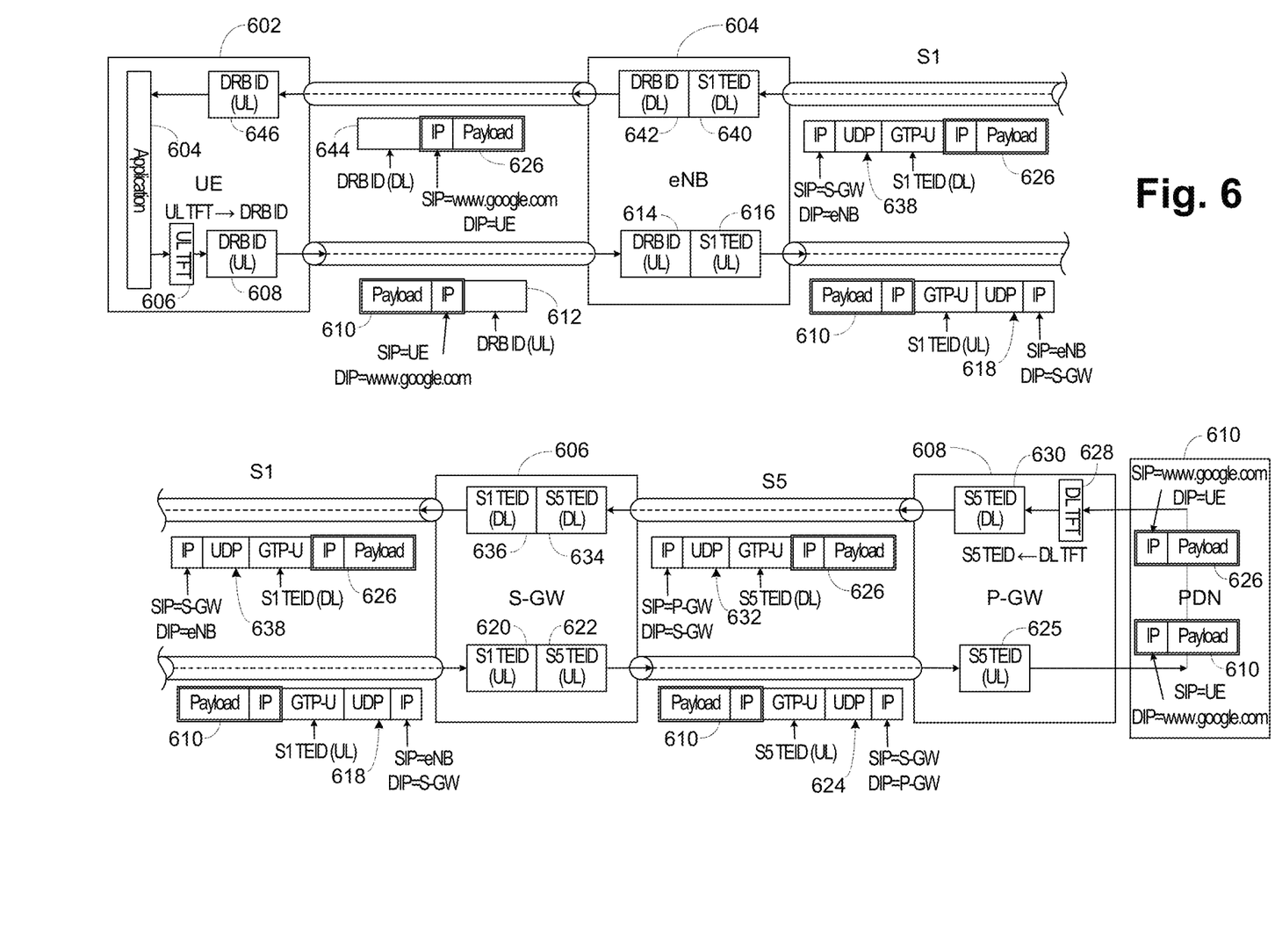
FIG. 6 is a block diagram of the packets and devices in the mobile core for transfers between a UE and a PDN or the Internet.

FIG. 6 is an additional illustration of data transfers between a UE 602 and a PDN 610. In the UE 602 an application 604 provides an IP packet to uplink TFT (Traffic Flow Template) filter 606, which provides the packet to the DRB module 608 to add the uplink DRB ID to the packet in preparation for transmission. The packet thus contains an IP packet 6100, which includes a source IP address of the UE 602 and a destination IP address of the target, and an uplink DRB ID 612. The packet is received at an eNB 604 uplink DRB ID module 614, which strips the DRB ID 612 and provides the IP packet 610 to an uplink S1 TEID module 616. The uplink S1 TEID module 616 adds a GTP tunnel header 618, including the appropriate TEID value, to the IP packet 610. The GTP tunnel header 618 has a source IP address of the eNB 604 and a destination IP address of an S-GW 606.

The GTP packet is received at an S-GW 606 uplink S1 TEID module 620, which strips the GTP tunnel header 618 and provides the IP packet 610 to an uplink S5 TEID module 622. The uplink S5 TEID module 622 adds a GTP tunnel header 624, including the appropriate TEID value, to the IP packet 610. The GTP tunnel header 624 has a source IP address of the S-GW 606 and a destination IP address of a P-GW 608.

The GTP packet is received at a P-GW 606 uplink S5 TEID module 625, which strips the GTP tunnel header 624 and provides the IP packet 610 to the PDN 610.

For downlink flow, the PDN 610 provides an IP packet 626, which includes a source IP address of the PDN 610 and a destination IP address of the UE 602, to a downlink TFT filter 628 in the P-GW 606, which provides the packet to a P-GW 606 downlink S5 TEID module 630. The downlink S5 TEID module 630 adds a GTP tunnel header 632, including the appropriate TEID value, to the IP packet 626. The GTP tunnel header 632 has a source IP address of the P-GW 608 and a destination IP address of the S-GW 606.

The GTP packet is received at an S-GW 606 downlink S5 TEID module 634, which strips the GTP tunnel header 632 and provides the IP packet 626 to a downlink S1 TEID module 636. The downlink S1 TEID module 636 adds a GTP tunnel header 638, including the appropriate TEID value, to the IP packet 626. The GTP tunnel header 638 has a source IP address of the S-GW 606 and a destination IP address of the eNB 604.

The GTP packet is received at an S-GW 606 downlink S1 TEID module 640, which strips the GTP tunnel header 638 and provides the IP packet 626 to a downlink DRB module 642 to add the downlink DRB ID to the packet in preparation for transmission. The packet thus contains an IP packet 628, which includes a source IP address of the PDN and a destination IP address of the UE 602, and a downlink DRB ID 644. The packet is received at an eNB 604 downlink DRB ID module 646, which strips the DRB ID 644 and provides the IP packet 626 to the application 604.

Figure 8:
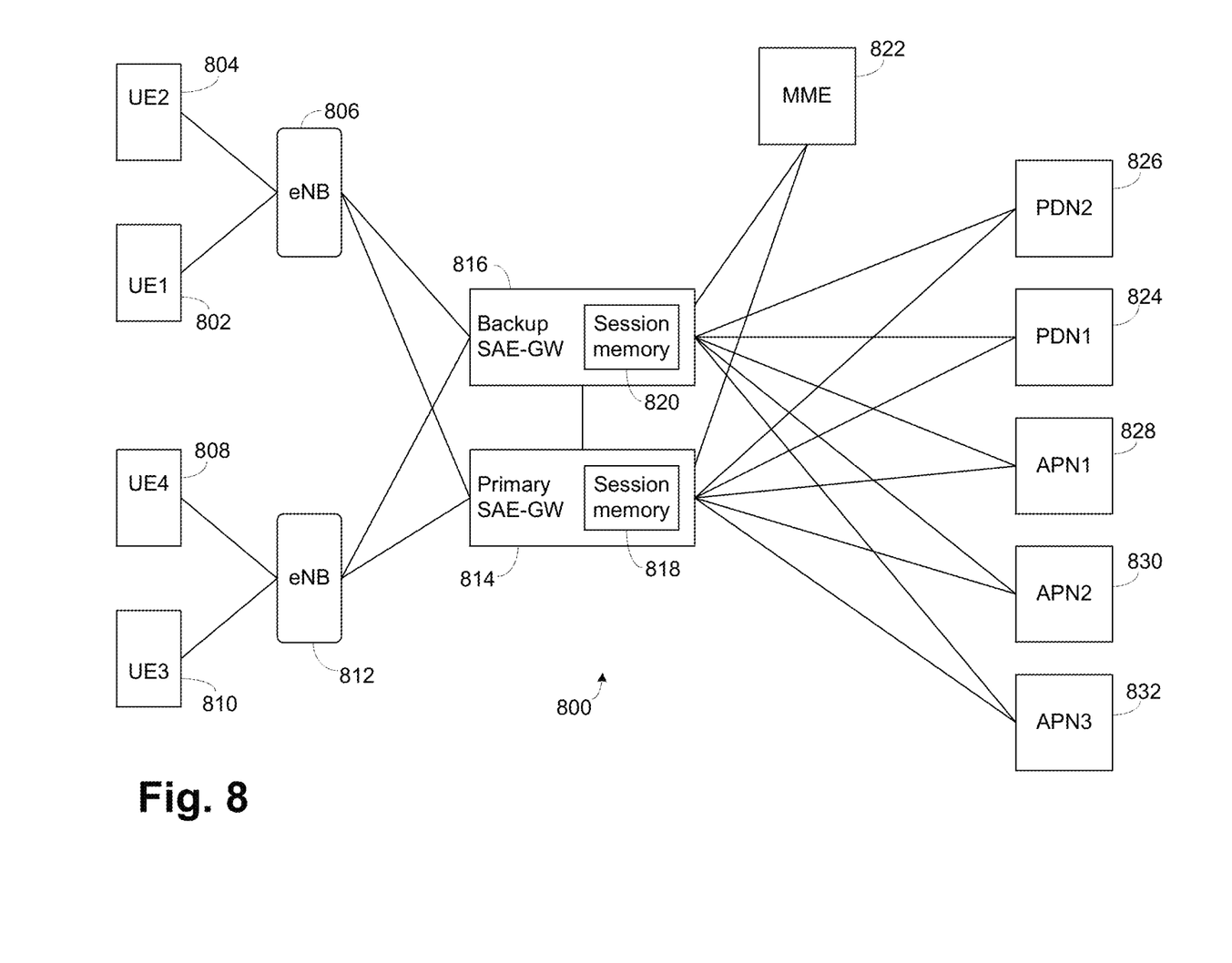
FIG. 8 is a block diagram of a mobile network according to the present invention.

FIG. 8 is a block diagram of a mobile network 800 according to the present invention. UE1 802 and UE2 804 are connected to an eNB 806. UE3 810 and UE4 808 are connected to an eNB 812. eNB 806 and eNB 812 are both connected to primary SAE-GW 814 and backup SAE-GW 816. Primary SAE-GW 814 and backup SAE-GW 816 each contain a session memory 818, 820, respectively, and are connected together to allow the content of the session memory 818 to be duplicated to the session memory 820 for failover purposes in conventional operation. Session memories 818 and 820 contain the state of the various sessions handled by the primary SAE-GW 814. Primary SAE-GW 814 and backup SAE-GW 816 each are connected to MME 822 and to PDN1 824, PDN2 826, APN1 828, APN2 830 and APN3 832. This is a very simple example of a network with SAE-GW failover capability for explanation purposes and it is understood that actual deployments would be much more complex.

With this background, the embodiments according to the present invention can be more easily explained.

Preferred embodiments according to the present invention encode the TEID to carry information that can be used to construct a partial flow table on the fly. As shown above, a GTP tunnel header includes the source and destination IP addresses of the communicating nodes. In the case when an eNB is connected to an SAE-GW, the source IP address is the IP address of the eNB and the destination IP address is the IP address of the SAE-GW.

Figure 9:
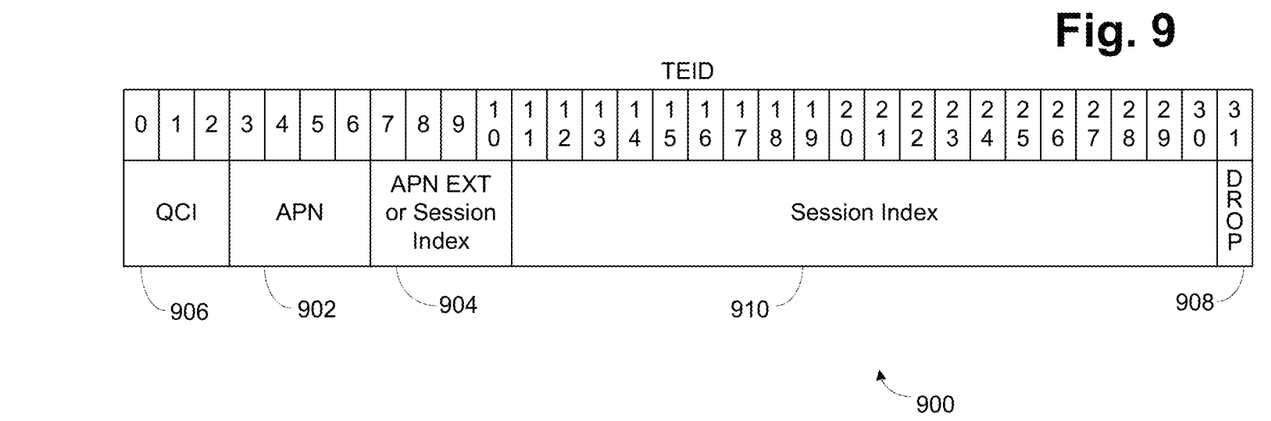
FIG. 9 is a diagram of the TEID field in a packet according to the present invention.

The TEID value is a 32-bit number as shown in FIGS. 7A and 7B and in FIG. 9 Of these 32 bits, four to eight bits are used to represent one of the configured APNs or PDNs served by the SAE-GW (or by a cluster of SAE-GWs). These are represented in the TEID 900 as APN bits 902 and APN EXT (extension) bits 904. The mapping of the APNs and PDNs to the APN bits 902 is maintained in the session memories 818 and 820.

There are nine QCIs in 4G, however characteristics of QCIs 8 and 9 are identical, so only three bits are needed to identify the QCI. This are shown as the QCI bits 906. A session may have a dynamic policy that may not be fully represented in the remaining bits available. In such cases, a DROP bit 908 can be encoded to indicate that the traffic should be dropped until the full session information is recovered.

The relevant scenario is when the primary SAE-GW 814 has failed over to the backup SAE-GW 816 and SAE-GW 816 does not have current (or any) session state. As noted in the background, this can arise if the SAE-GW is a virtual machine that has just been initiated to be the backup SAE-GW or if session synchronization is behind.

By providing the APN value 902 and QCI value 906 in the TEID, the backup SAE-GW can use those values to properly route the packet even without session information on the particular session. The APN value 902 and QCI value 906 are used to select the proper port on the SAE-GW to provide the packet to the proper PDN or APN. Therefore, the SAE-GW can remove the GTP tunnel header as normal and then provide the received IP packet to the determined egress port and the IP packet is routed to the proper PDN or APN without the delay of waiting for session table synchronization. If the DROP bit 908 is set, this operation is not performed and the IP packet is dropped until the full session information is obtained.

This way the majority of sessions will have their packet forwarding restored quickly while a few special sessions will wait for full session recovery.

It is noted that many TEID bits remain unallocated. The remaining (up to 25) bits can be used to identity a unique user session 910, with even 21 bits providing up to 2M such session indices. Alternatively, any policy statically configured can be coded in the remainder bits to be used in addition to the APN and QCI bits for routing the IP packet.

Conventionally, the SAE-GW assigns a 32-bit number as a Charging ID to each session, which together with the SAE-GW IP address, forms a globally unique charging identifier. In an alternate embodiment, some of the remaining up to 25 TEID bits can be used as the charging ID to allow charging of the session even without session context.

In an alternate embodiment, the backup SAE-GW 816 does not carry a session table until after failover and hence does not require periodic checkpointing. This simplifies operations of the primary SAE-GW 814, as well as the backup SAE-GW 816. This can occur as IP packets coming from the UEs can be routed without a session table entry, as discussed above. The backup SAE-GW 814 does maintain configuration information, such as the PDN/APN table and related routing information, but this is relatively static information and so much less burden on the primary SAE-GW 814.

As the backup SAE-GW does not require checkpointing and the APN/PDN table is relatively small and will not change frequently, a backup SAE-GW can backup numerous primary SAE-GWs and not be dedicated to a single SAE-GW. This changes the backup ratio from 1:1 or 1:N as in the prior art to N:1, greatly reducing the cost of SAE-GW redundancy. Indeed, if the backup SAE-GW is a virtual machine that is only initiated on failover, the effective backup ratio is now N:0. When a supervising entity detects the failure of a primary SAE-GW, the supervising entity instructs the backup SAE-GW to assume the primary's role. This assumption of the role can be accomplished by the backup SAE-GW sending a gratuitous ARP to the next hop router with the primary SAE-GW IP address. Further, the supervising entity sets a "recovery" or "switchover" flag in the backup SAE-GW while instructing it to go active to indicate that it is now in active mode and should build the session table, synchronizing from the primary SAE-GW if possible or developing the session table from scratch. To develop the session table from scratch, if this is the first packet of the session after failover or switchover, the backup SAE-GW would not find an entry in the session table. The backup SAE-GW then puts the session index, APN value, QCI value, any other values in the TEID, the IP addresses in the IP packet, the IP address of the eNB as determined from the GTP tunnel header and any other known values into the session table as seed values.

In an alternate embodiment, instead of the supervising entity setting a "switchover" flag in the backup SAE-GW, the supervising entity instructs the eNBs to place "switchover" flags in the packets destined to the backup SAE-GW. When a packet arrives from the eNB, the backup SAE-GW examines the incoming packet, and notices the "switchover" flag placed by the eNB. The backup SAE-GW processes the packet as discussed above and develops a session table entry for the session as described above.

While the backup SAE-GW is processing a packet to develop the session table entries as discussed above, the backup SAE-GW can also develop the downlink TFT. The backup SAE-GW uses the 5 tuple of the IP header of the IP packet inside the GTP payload to create the TFT. By flipping the source and destination addresses and ports of the incoming IP packet, a TFT entry is created dynamically and stored in the session table or elsewhere.

As discussed above, in some embodiments the TEID can include a charging ID. This charging ID is placed in the session table entry as it is developed, the charging ID being another TEID field value mentioned above. If the TEID does not contain a charging ID, the backup SAE-GW (now primary) counts the number of bytes in each user packet and accumulates that value with a byte count value maintained in the entry in the session table for later charging when complete session state is developed.

While the above discussion has focused on packets arriving from the eNB at the SAE-GW, for the packets arriving from the PDN or APN side, the session table look up is done based on the IP packet destination address. If the session table has a corresponding entry, as an IP packet has been transferred from the eNB to the backup SAE-GW previously, the packet arriving from the PDN or APN can be processed. The destination IP address for the relevant eNB is retrieved from the session table and used in the GTP tunnel header as the destination IP address i.e. it can be put in a GTP header and sent to the eNB.

If there is no corresponding entry in the session table, the SAE-GW queries the session database (SDB) in the MME to retrieve the necessary information. Such a query can take hundred millisecond or more over the network. The SAE-GW drops packets until it has sufficient information to process the packet. If the session information retrieved indicates that the arriving packet is for a session marked idle, a paging procedure is used to obtain session information from the UE.

As noted above, the values placed in the session table based on the live development of the session table are somewhat limited. Conventionally a session table entry includes much more information. To allow this additional information to be obtained, in an alternate embodiment a background recovery task is running on the backup SAE-GW whose job it is to retrieve all session information from the SDB belonging to this SAE-GW. The background recovery task completes the partial session entries created as discussed above and inserts missing session entries obtained from the SDB. Once the background recovery task is complete, the backup SAE-GW turns off the "switchover" flag or instructs the various eNBs to stop inserting enabled "switchover" bits.

Figure 10:
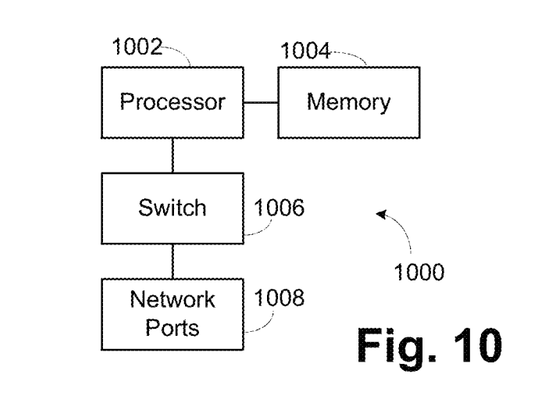
FIG. 10 is a block diagram of an S-GW, P-GW or SAE-GW.

As known to one skilled in the art and shown in FIG. 10, S-GWs, P-GWs and SAE-GWs are complicated and expensive computer systems and packet routers, which include a processor 1002, network interfaces or ports 1008, a packet switch 1006 for packet routing and a memory 1004 to store programs and data. The operations, such as those described here, are performed by programs stored in the memory and executing on the processor and by hardware in the packet switch. If the gateway is a virtual gateway, the packet switch 1006 may be a virtual switch. Because the structure and operation of an S-GW, a P-GW and an SAE-GW are so well known, further details of their construction, configuration and operation are not provided here.

While this invention is described in context of 4G mobile network using an SAE-GW, it applicability to security GW (IPsec-GW), etc. would be apparent to the skilled in art.

Additionally, operation on separate S-GWs and P-GWs is performed in a similar manner. The S-GW will use the APN and QCI bits in the TEID to select the desired P-GW, whose routing will be known. The S-GW will build the state table using the eNB address provided in the GTP header to route packets arriving from the P-GW to the proper eNB. The P-GW will use the APN and QCI bits as described to route the packets to the desired APN or PDN. The P-GW will build the state table using the S-GW address provided in the GTP header to route packets arriving from the APN or PDN to the proper S-GW. The S-GW will then route the packets to the proper eNB as noted. Therefore, as in the described SAE-GW, the failover or backup requirements of the S-GWs and P-GWs are lessened without introducing delays into the packet routing.

It is further understood that the review of the TEID for APN and QCI bits for packet routing and review of the packet for IP addresses and the like for development of the session table need only be done the first time by the gateway processor executing software and thereafter packet routing may be handled in hardware by inspection of the TEID and other relevant portions of the packet. Similarly, it is understood that the various operations described above may be performed by the gateway processor in at least the first occurrence and may later be performed by hardware in the gateway.

By encoding the TEID bits with proper information, such as QCI and APN information, the gateways can route packets without a state table entry synchronized from a primary gateway. This simplifies system architecture and cost by reducing the need for backup gateways, without penalizing system performance.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A mobile core gateway comprising:
   a first port for coupling to a user equipment (UE);
   a plurality of ports, each port for coupling to a different route to a plurality of packet data networks (PDNs);
   a processor coupled to the first port and the plurality of ports;
   a session memory coupled to the processor for storing session state for UE sessions being handled by the mobile core gateway; and
   a memory coupled to the processor and storing a plurality of programs executed by the processor, wherein at least one stored program causes the processor to review tunnel endpoint identifier (TEID) bits of a packet received from a UE for bits used to select a route and a port of the plurality of ports for transmitting the received packet without reliance on the session memory;
   wherein a QCI group of the TEID bits identify the quality of service class identifier (QCI) of the session and a PDN group of TEID bits identify the PDN of the session, and wherein the processor reviews the QCI bits and the PDN bits to select the route and the port of the plurality of ports;
   wherein at least one stored program causes the processor to store the QCI bits, the PDN bits, an Internet protocol (IP) address of the UE and an IP address of the device providing the received packet to the mobile core gateway in a session entry in the session memory to develop session state for the UE session; and
   wherein at least one stored program causes the processor to drop packets received from a PDN intended for a UE until a session entry is present in the session memory containing that PDN and an IP address for that UE.

2. The mobile core gateway of claim 1, wherein at least one stored program causes the processor to populate the session memory as a background task.

3. The mobile core gateway of claim 1, wherein a group of the TEID bits provides a charging identifier for the UE session.

4. The mobile core gateway of claim 1, wherein the mobile core gateway is a backup gateway and the backup gateway does not checkpoint entries in the session memory from a primary gateway.

5. The mobile core gateway of claim 1, where the mobile core gateway is a system architecture evolution gateway (SAE-GW), wherein the first port is coupled to an evolved node B (eNB) and wherein the plurality of ports are coupled to the plurality of PDNs without an intervening mobile core device.

6. The mobile core gateway of claim 1, where the mobile core gateway is a serving gateway (S-GW), wherein the first port is coupled to an evolved node B (eNB) and wherein the plurality of ports are coupled to a plurality of packet data network gateways (P-GWs) which are used to access the plurality of PDNs.

7. The mobile core gateway of claim 1, where the mobile core gateway is a packet data network gateway (P-GW), wherein the first port is coupled to a serving gateway (S-GW) and wherein the plurality of ports are coupled to the plurality of PDNs without an intervening mobile core device.

8. A method comprising:
   receiving, by a mobile core gateway, the mobile core gateway having a first port for coupling to a user equipment (UE), a plurality of ports, each port for coupling to a different route to a plurality of packet data networks (PDNs), a processor coupled to the first port and the plurality of ports, a session memory coupled to the processor for storing session state for UE sessions being handled by the mobile core gateway, and a memory coupled to the processor and storing a plurality of programs executed by the processor, a packet from a UE;
   selecting, by the mobile core gateway, a route and a port of the plurality of ports for transmitting the received packet without reliance on the session memory based on a review of tunnel endpoint identifier (TEID) bits of the received UE packet, wherein a QCI group of the TEID bits identify the quality of service class identifier (QCI) of the session and a PDN group of TEID bits identify the PDN of the session, and wherein the mobile core gateway reviews the QCI bits and the PDN bits to select the route and the port of the plurality of ports;
   storing the QCI bits, the PDN bits, an Internet protocol (IP) address of the UE and an IP address of the device providing the received packet to the mobile core gateway in a session entry in the session memory to develop session state for the UE session; and
   dropping packets received from a PDN intended for a UE until a session entry is present in the session memory containing that PDN and an IP address for that UE.

9. The method of claim 8, further comprising:
   populating, by the mobile core gateway, the session memory as a background task.

10. The method of claim 8, wherein a group of the TEID bits provides a charging identifier for the UE session.

11. The method of claim 8, wherein the mobile core gateway is a backup gateway and the backup gateway does not checkpoint entries in the session memory from a primary gateway.

12. The method of claim 8, where the mobile core gateway is a system architecture evolution gateway (SAE-GW), wherein the first port is coupled to an evolved node B (eNB) and wherein the plurality of ports are coupled to the plurality of PDNs without an intervening mobile core device.

13. The method of claim 8, where the mobile core gateway is a serving gateway (S-GW), wherein the first port is coupled to an evolved node B (eNB) and wherein the plurality of ports are coupled to a plurality of packet data network gateways (P-GWs) which are used to access the plurality of PDNs.

14. The method of claim 8, where the mobile core gateway is a packet data network gateway (P-GW), wherein the first port is coupled to a serving gateway (S-GW) and wherein the plurality of ports are coupled to the plurality of PDNs without an intervening mobile core device.

\* \* \* \* \*